US008161380B2

(12) United States Patent
Bar-Or et al.

(10) Patent No.: US 8,161,380 B2
(45) Date of Patent: Apr. 17, 2012

(54) PIPELINE OPTIMIZATION BASED ON POLYMORPHIC SCHEMA KNOWLEDGE (75) Inventors: Amir Bar-Or, Newton, MA (US); Michael James Beckerle, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/147,408

(22) Filed: Jun. 26, 2008

(65) Prior Publication Data

US 2009/0327870 A1    Dec. 31, 2009

(51) Int. Cl.
*G06F 17/00* (2006.01)
(52) U.S. Cl. ......... 715/249; 715/205; 715/234; 715/242
(58) Field of Classification Search .................. 715/200, 715/201, 202, 203, 204, 205, 206, 226, 231, 715/234, 235, 236, 239, 242, 243, 249, 255, 715/256, 273, 700, 731, 760, 762
See application file for complete search history.

(56) References Cited

U.S. PATENT DOCUMENTS

| | | | |
|---|---|---|---|
| 4,145,733 A | 3/1979 | Misunas et al. | |
| 5,021,947 A | 6/1991 | Campbell et al. | |
| 5,465,372 A | 11/1995 | Gottlieb et al. | |
| 5,555,201 A | 9/1996 | Dangelo et al. | |
| 5,603,018 A | 2/1997 | Terada et al. | |
| 5,724,570 A | 3/1998 | Zeller et al. | |
| 5,801,958 A | 9/1998 | Dangelo et al. | |
| 5,806,062 A | 9/1998 | Chen et al. | |
| 5,822,593 A | 10/1998 | Lamping et al. | |
| 6,192,504 B1 | 2/2001 | Pflüger et al. | |
| 6,311,265 B1 | 10/2001 | Beckerle et al. | |
| 6,601,058 B2 | 7/2003 | Forster et al. | |
| 6,654,952 B1 | 11/2003 | Nair et al. | |
| 6,772,398 B2 | 8/2004 | Saluja et al. | |
| 6,801,938 B1 | 10/2004 | Bookman et al. | |
| 6,832,357 B2 | 12/2004 | Saluja et al. | |
| 6,880,125 B2 * | 4/2005 | Fry | 715/234 |
| 6,918,111 B1 | 7/2005 | Damron et al. | |
| 6,954,749 B2 | 10/2005 | Greenblatt et al. | |
| 7,080,088 B1 | 7/2006 | Lau | |
| 7,089,567 B2 * | 8/2006 | Girardot et al. | 719/330 |
| 7,254,590 B2 | 8/2007 | Mudunuri et al. | |
| 7,299,458 B2 | 11/2007 | Hammes | |
| 7,392,514 B2 | 6/2008 | Edwards | |
| 7,454,413 B2 * | 11/2008 | Lakshminarayanan et al. | 1/1 |

(Continued)

OTHER PUBLICATIONS

Arvind and R.S. Nikhil, "Executing a Program on the MIT Tagged-Token Dataflow Architecture", IEEE Transactions on Computers, vol. 39, No. 3, Mar. 1990, pp. 300-318.

(Continued)

*Primary Examiner* — Maikhanh Nguyen
(74) *Attorney, Agent, or Firm* — Janaki K. Davda; Konrad Raynes & Victor LLP (57) ABSTRACT Provided are techniques for pipeline optimization based on polymorphic schema knowledge. A hierarchical document to be processed by a pipeline of transformations is received. It is determined whether a next downstream transformation accesses content of each schema node in an associated input schema, wherein the input schema is a polymorphic schema. In response to determining that the next downstream transformation is not accessing the content of each schema node in the associated input schema, data items corresponding to each schema node that the next downstream transformation is not accessing are collected into a single compressed event. The collected items are passed to the next downstream transformation as the single compressed event.

12 Claims, 6 Drawing Sheets

U.S. PATENT DOCUMENTS

| | | | |
|---|---|---|---|
| 7,467,371 | B1 | 12/2008 | Meredith et al. |
| 7,496,585 | B2 * | 2/2009 | Blount et al. ............................ 1/1 |
| 7,836,066 | B2 * | 11/2010 | Chang et al. ................... 707/760 |
| 2002/0080181 | A1 | 6/2002 | Razdow et al. |
| 2003/0014379 | A1 | 1/2003 | Saias et al. |
| 2003/0023628 | A1 * | 1/2003 | Girardot et al. ............... 707/513 |
| 2003/0159111 | A1 * | 8/2003 | Fry ............................... 715/513 |
| 2003/0191765 | A1 | 10/2003 | Bargh et al. |
| 2003/0200538 | A1 | 10/2003 | Ebeling et al. |
| 2004/0117772 | A1 | 6/2004 | Brand et al. |
| 2004/0123072 | A1 | 6/2004 | Kailas et al. |
| 2004/0205058 | A1 | 10/2004 | Kiji |
| 2004/0207665 | A1 | 10/2004 | Mathur |
| 2004/0225999 | A1 | 11/2004 | Nuss |
| 2005/0071359 | A1 | 3/2005 | Elandassery et al. |
| 2005/0097561 | A1 | 5/2005 | Schumacher et al. |
| 2005/0251527 | A1 | 11/2005 | Phillips et al. |
| 2005/0257194 | A1 | 11/2005 | Morrow et al. |
| 2005/0257195 | A1 | 11/2005 | Morrow et al. |
| 2006/0005173 | A1 | 1/2006 | Eng |
| 2006/0020951 | A1 * | 1/2006 | Fry et al. ........................ 719/328 |
| 2006/0048113 | A1 | 3/2006 | Ozone et al. |
| 2006/0150164 | A1 * | 7/2006 | Agrawal ........................ 717/136 |
| 2006/0277392 | A1 | 12/2006 | Bittner, Jr. |
| 2007/0136262 | A1 * | 6/2007 | Dettinger et al. ................... 707/4 |
| 2007/0220486 | A1 * | 9/2007 | Lammel et al. ............... 717/114 |
| 2008/0052687 | A1 | 2/2008 | Gonzales-Tuchmann et al. |
| 2008/0082984 | A1 | 4/2008 | McDaniel |
| 2008/0133209 | A1 | 6/2008 | Bar-Or et al. |
| 2008/0134158 | A1 | 6/2008 | Salz et al. |
| 2009/0063515 | A1 | 3/2009 | Bar-Or et al. |
| 2009/0063583 | A1 | 3/2009 | Bar-Or et al. |
| 2009/0064157 | A1 | 3/2009 | Bar-Or et al. |

OTHER PUBLICATIONS

Bowers, S., B. Ludascher, A.H.H. Ngu, and T. Critchlow, "Enabling Scientific Workflow Reuse through Structured Composition of Dataflow and Control-Flow", Proceedings of the 22nd International Conference on Data Engineering Workshops, 2006, 10 pp.

Cardelli, L., and P. Wegner, "On Understanding Types, Data Abstraction, and Polymorphism", Computing Surveys, vol. 17, No. 4, Dec. 1985, pp. 471-522.

Florescu, D., C. Hillery, D. Kossmann, P. Lucas, F. Riccardi, T. Westmann, M.J. Carey, A. Sundarajan, and G. Agrawal, "The BEA/XQRL Streaming XQuery Processor", Proceedings of the 29th VLDB Conference, 2003, 12 pp.

Kelly, P.M., P.D. Coddington, and A.L. Wendelborn, "Compilation of XSLT into Dataflow Graphs for Web Service Composition", Proceedings of the Sixth IEEE International Symposium on Cluster Computing and the Grid, 2006, 9 pp.

Koch, C., S. Sherzinger, N. Schweikardt, and B. Stegmaier, "FluXQuery: An Optimizing XQuery Processor for Streaming XML Data", Proceedings of the 30th VLDB Conference, 2004, pp. 1309-1312.

Ldodds.Com, "XML Pipeline", [online], updated on Aug. 21, 2002, [retrieved on Apr. 9, 2007], retrieved from the Internet at <URL: http://www.Idodds.com/wordtin/wiki.jsp?page=XMLPipeline>, 2 pp.

Leymann, F., and D. Roller, "Production Workflow: Concepts and Techniques", Sep. 1999, Prentice Hall PTR, 5 pp.

Morgenthal, J.P., "Enterprise Information Integration: A Pragmatic Approach", May 30, 2005, Lulu.com, 4 pp.

Morrison, J.P., "Data Responsive Modular Interleaved Task Programming System", IBM Technical Disclosure Bulletin, Jan. 1971, pp. 2425-2426.

Morrison, J.P., "Data Stream Linkage Mechanism", IBM System Journal, vol. 17, No. 4, 1978, pp. 383-408.

Morrison, J.P., "Flow-Based Programming: A New Approach to Application Development", Van Nostrand Reinhold, New York, 1994, Chapter 10, 13 pp.

Pal, S., I. Cseri, O. Seeliger, M. Rys, G. Schaller, W. Yu, D. Tomic, A. Baras, B. Berg, D. Churin, and E. Kogan, "XQuery Implementation in a Relational Database System", Proceedings of the 31st VLDB Conference, 2005, pp. 1175-1186.

W3C, "XSL Transformations (XSLT) Version 2.0", [online], Jan. 23, 2007, [retrieved on Jun. 20, 2008], retrieved from the Internet at <URL: http://www.w3.org/TR/xslt20>, 50 pp.

Wikipedia, "Flow-based Programming", [online], modified Jun. 12, 2008, [retrieved on Jun. 26, 2008], retrieved from the Internet at <URL: http://en.wikipedia.org/wiki/Flow-based_programming>, 7 pp.

Wikipedia, "XML Pipeline", [online], modified Apr. 1, 2008, [retrieved on Apr. 19, 2008], retrieved from the Internet at <URL: http://en.wikipedia.org/wiki/XML_pipeline>, 4 pp.

Yu, D.C. and H. Wang, "A New Approach for the Forward and Backward Substitutions of Parallel Solution of Sparse Linear Equations-Based on Dataflow Architecture", IEE Transactions on Power Systems, vol. 5, No. 2, May 1990, pp. 621-627.

Dennis, J.B. and David P.M., "A Preliminary Architecture for a Basic Data-Flow Processor", vol. 3, No. 4, Dec. 1974, pp. 126-132.

Miyazaki, T., and Edward A.L., "Code Generation by Using Integer-Controlled Dataflow Graph", Proceedings of the 1997 IEEE Internatinoal Conference on Acoustics, Speech, and Signal Processing, vol. 1, 1997, 4 pp.

Neubauer, F., A. Hoheisel, and J. Geiler, "Workflow-based Grid Applications", © 2005 Elsevier, pp. 1-15.

Weimer, W. and G.C. Necula, "Finding and Preventing Run-Time Error Handling Mistakes", © 2004 ACM, vol. 39, No. 10, pp. 419-431.

* cited by examiner

FIG. 1

```
Input Schema 200

<complexType>
   < sequence>
      < element name="Address" type=" string" />  —— 210
      < any maxOccur="unbounded" id="otherSuff" />  —— 220
   </sequence>
</complexType>
```

FIG. 2A

```
Output Schema 250

<xs:complexType>
   <xs:sequence>
      <xs:element name="Norm_Address"type=" string" />  —— 260
      <xs:any maxOccur="unbounded" id="otherSuff" />  —— 270
   </xs:sequence>
</xs:complexType>
```

FIG. 2B

```
Input Schema 300

<element name="ContactPerson">
    <complexType>
        <sequence>
            <element name="Address" type="string" />      ── 310
            <element name="FullName" type="string" />     ── 320
            <element name="PhoneNumber" type="string" />  ── 330
        </sequence>
    </complexType>
</element>
```

FIG. 3A

```
Input Schema 350

<element name="Factory">
    <complexType>
        <sequence>
            <element name="Address" type="string" />       ── 360
            <element name="Company" type="string" />       ── 370
            <element name="NumEmployees" type="string" />  ── 380
        </sequence>
    </complexType>
</element>
```

```
Input Schema 500

<complexType name="SalesPerson">  ── 510
    <complexContent>
        <extension base="ContactPerson">  ── 520
        < sequence>
            < element name="Bonus" type="double" />  ── 530
            < element name="Products" maxOccur="unbounded" type="Product" />── 540
        </sequence>
    </complexContent>
</complexType>
```

FIG. 5A

```
Input Schema 550

<complexType name="ContactPerson">  ── 560
    < sequence>
        < element name="Name" type="string" />  ── 570
        < any maxOccur="unbounded" id="sys:otherStuff" />  ── 580
    </sequence>
</complexType>
```

PIPELINE OPTIMIZATION BASED ON POLYMORPHIC SCHEMA KNOWLEDGE

BACKGROUND

1. Field

Embodiments of the invention relate to pipeline optimization based on polymorphic schema knowledge.

2. Description of the Related Art

An Extensible Markup Language (XML) Pipeline is formed when XML processes, sometimes called XML transformations or processing components, are connected together. For instance, given two transformations T1 and T2, the two transformations may be connected together so that an input XML document is transformed by T1 and then the output of T1 is fed as input document to T2 (See wikipedia.org on the World Wide Web). Each of the XML transformations works on some portion of an XML document.

XML processing is conveniently expressed by use of XML Pipelines, where each transformation is simple and focuses on a small part of the overall document being transformed. However, the over-all transformation carried out by the whole pipeline may be quite complex.

When processing XML data in pipelines like this, if the transformations are individually simple, then naïve implementations may spend far more time carrying around (e.g., transferring between transformations), parsing, and serializing the parts of the XML documents that they are not transforming, than on performing the transformations on the parts of the XML documents they care about.

Polymorphic schemas may be described as schemas with wildcard schema nodes. Polymorphic schema interfaces are used in programming languages (Luca Cardelli, Peter Wegner, On Understanding Types, Data Abstraction, and Polymorphism, from Computing Surveys, (December, 1985)). The IBM® WebSphere® DataStage® engine uses polymorphic transformation operators on relational data, where wildcard schema nodes are used to match up a list of columns that are just being passed to the output (IBM, WebSphere, and DataStage are trademarks of International Business Machines Corporation in the United States, other countries, or both).

Extensible Stylesheet Transformations (XSLT) version 2.0 allows schemas to be associated with a stylesheet (w3.org/TR/xslt20 on the World Wide Web).

However, there is still a need in the art for pipeline optimization based on polymorphic schema knowledge.

SUMMARY OF EMBODIMENTS OF THE INVENTION

Provided are a method, computer program product, and system for pipeline optimization based on polymorphic schema knowledge. A hierarchical document to be processed by a pipeline of transformations is received. It is determined whether a next downstream transformation accesses content of each schema node in an associated input schema, wherein the input schema is a polymorphic schema. In response to determining that the next downstream transformation is not accessing the content of each schema node in the associated input schema, data items corresponding to each schema node that the next downstream transformation is not accessing are collected into a single compressed event. The collected items are passed to the next downstream transformation as the single compressed event.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
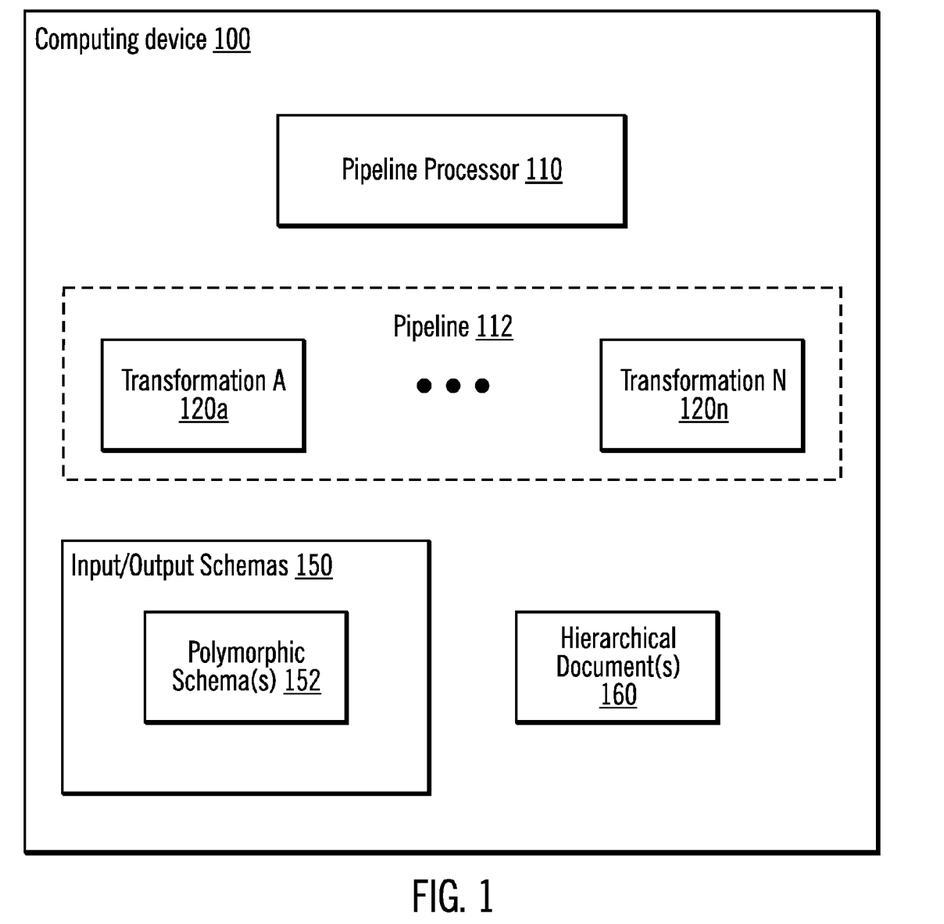
FIG. 1 illustrates details of a computing device in accordance with certain embodiments.

FIG. 1 illustrates details of a computing device 100 in accordance with certain embodiments. A computing device 100 includes an pipeline processor 110 (e.g., an XML pipeline processor) and two or more individual transformations 120a . . . 120n (where the ellipses and the letters "a" and "n" indicate that there are two or more individual transformations). The individual transformations 120a . . . 120n illustrated are Transformation A 120a and Transformation N 120n. The individual transformations 120a . . . 120n form a pipeline 112 (e.g., an XML pipeline).

The computing device 100 also includes one or more input and output schemas 150 and one or more hierarchical documents 160 (e.g., XML documents). Polymorphic schemas 152 may be described as a subset of the input and output schemas 150. Polymorphic schemas 150 may be described as schemas (i.e., input or output) with wildcard schema nodes. An input schema 150 is a schema that is provided as input to a transformation 120a . . . 120n, and an output schema 150 is a schema that is provided as output from a transformation 120a . . . 120n. A schema may be described as a tree of schema nodes. A concrete schema describes a hierarchical document in which each schema node has an associated type. A polymorphic schema is a generalization of a set of other more concrete schemas. Each schema node in the polymorphic schema is associated with a type that is the generalization of the matching schema nodes types in the concrete schemas. Wildcard schema nodes are a further generalization (i.e., a generalization of all types). Wildcards do not describe any constraints on the content, just the existence of such content. Therefore, a transformation 120a . . . 120n that has an input schema with a wildcard schema node transfers the content associated with the wildcard schema node as is without any additional processing.

The pipeline processor 110 is coupled to the individual transformations 120a . . . 120n and is capable of providing data to each individual transformation 120a . . . 120n and transferring data between the individual transformations 120a . . . 120n. Data is described by schemas, polymorphic or not. Data refers to the actual instance data (e.g., Amir Bar-Or is data for the schema FullName:String).

Embodiments improve the execution performance of transformations (e.g., XML transformations) expressed as a pipeline. Embodiments specify transformations using polymorphic schemas so that the transformations are expressed in a way that makes it clear which parts of a hierarchical document (e.g., an XML document) each of the transformations processes and which parts each of the transformations carries along (e.g., because different transformations will be using different parts of the hierarchical document). Embodiments provide optimizations so that the parts of the hierarchical document 160 that are not being transformed are handled with less overhead.

A hierarchical document 160 may be described as including hierarchical data. Hierarchical data may be described as including nested structures, which in turn may include nested repeating vector nodes. A vector node may represent a vector of a complex structure that can, in turn, contain multiple scalars (represented by scalar nodes and vectors (represented by vector nodes). In certain embodiments, hierarchical data may be represented as a hierarchical tree data structure having sub-trees.

With embodiments, each transformation 120*a* . . . 120*n* in the XML pipeline provides an input schema and an output schema that describe the structure of input data and output data, respectively, for that transformation 120*a* . . . 120*n*. A schema may be described as a tree of schema nodes that describe different types of data items. In certain embodiments, the data items are infoset items.

In certain embodiments, infoset items are XML Information Set (infoset) items. XML infoset may be described as a World Wide Web Consortium (W3C) specification describing an abstract data model of an XML document in terms of a set of information items. The definitions in the XML Information Set specification are meant to be used in other specifications that need to refer to the information in a well-formed XML document.

An XML Information Set may contain up to eleven different types of information items:
1. The Document Information Item
2. Element Information Items
3. Attribute Information Items
4. Processing Instruction Information Items
5. Unexpanded Entity Reference Information Items
6. Character Information Items
7. Comment Information Items
8. The Document Type Declaration Information Item
9. Unparsed Entity Information Items
10. Notation Information Items
11. Namespace Information Items Simple API for XML (SAX) and Streaming API for XML (StAX) are event based APIs for processing streams of XML documents. SAX is a push-API in which different methods of the XML process are called for every type of event, while StAX is a pull-API in which the XML process iterates through the events in the stream. The events correspond to begin and end events of the information items in the XML Information Set.

A wildcard schema node may be described as a node that does not define any specific type, and, therefore, any data in the hierarchical document 160 may match this wildcard schema node. A schema is called a polymorphic schema if the schema contains at least a single wildcard schema node. With polymorphic schemas, the pipeline processor 110 transforms various hierarchical documents where the information has different schemas that describe the document structures. That is, the same processing transformation 120*a* . . . 120*n* is able to process documents with different structures if the documents adhere to the polymorphic schema (e.g., with a polymorphic schema a int, b wildcard, all documents that have an A integer and any other structure can be transformed by a particular transformation 120*a* . . . 120*n*).

Figure 2A:
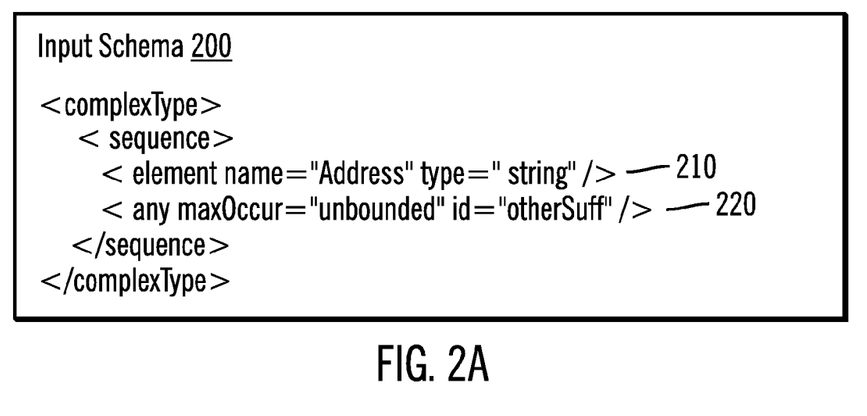
FIGS. 2A and 2B illustrate an example input schema and an example output schema in accordance with certain embodiments.
Figure 2B:
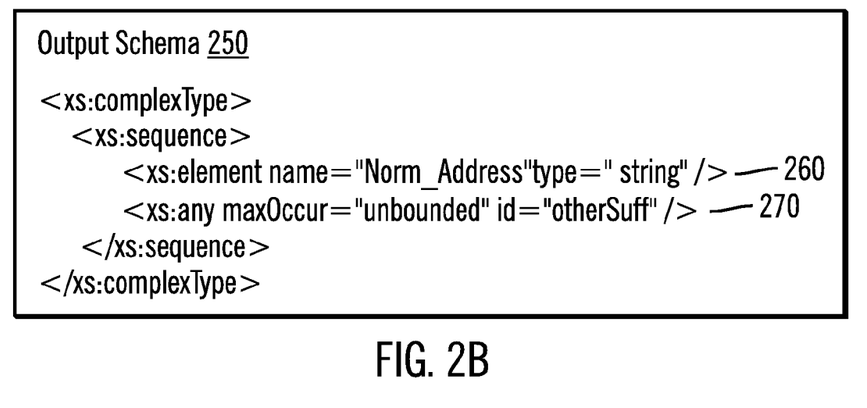

FIGS. 2A and 2B illustrate an example input schema 200 and an example output schema 250 in accordance with certain embodiments. For example, a transformation 120*a* . . . 120*n* receives the input schema 200, with a schema node 210 ("<element name="Address" type="string"/>") having a name of "Address" of type string. The transformation 120*a* . . . 120*n* normalizes and validates the address string in schema node 210. The transformation 120*a* . . . 120*n* generates the output schema 250, with a schema node 260 ("<xs:element name="Norm_Address" type="string"/>") describing a normalized address "Norm_Address" of type string.

Also, the input schema 200 includes a wildcard schema node 220 ("<any maxOccur="unbounded" id="other Stuff"/>"). With this wildcard schema node, the transformation 120*a* . . . 120*n* may take any input element whose type has a child element named "Address", normalize and validate the address, and pass on the rest of the elements as the schema node 220.

Figure 3A:
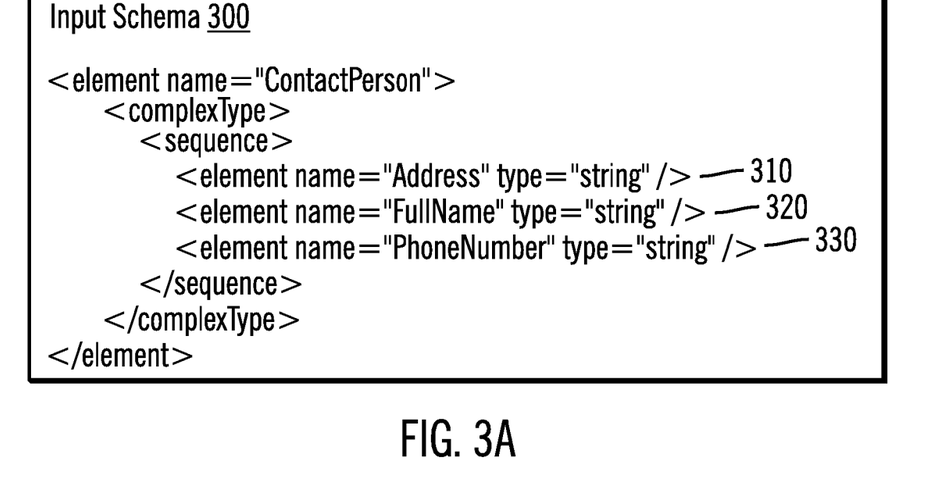
FIGS. 3A and 3B illustrate example input schemas in accordance with certain embodiments.

FIGS. 3A and 3B illustrate example input schemas 300, 350 in accordance with certain embodiments. Input schema 300 has an element name of "ContactPerson" with schema node 310 ("<element name="Address" type="string"/>") corresponding to schema node 210 ("<element name="Address" type="string"/>"). From the input schema 300, the transformation 120*a* . . . 120*n* treats the remaining schema nodes 320 ("<element name="FullName" type="string"/>") and 330 ("<element name="PhoneNumber" type="string"/>") as corresponding to the wildcard schema node 220 ("<any maxOccur="unbounded"id="otherStuff"/>"). The transformation 120*a* . . . 120*n* normalizes and validates the address string.

Figure 3B:
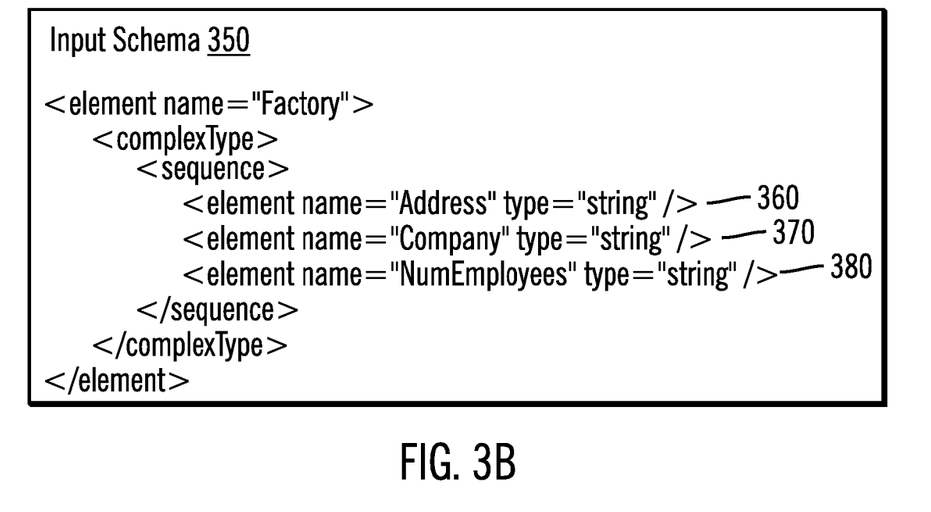

Similarly, input schema 350 has an element name of "Factory" with schema node 360 ("<element name="Address" type="string"/>") corresponding to schema node 210 ("<element name="Address" type="string"/>"). From the input schema 300, the transformation 120*a* . . . 120*n* treats the remaining schema nodes 370 ("element name="Company"type="string"/>") and 380 ("<element name="NumEmployees" type="string"/>") as corresponding to the wildcard schema node 220 ("<any maxOccur="unbounded"id="otherStuff"/>"). The transformation 120*a* . . . 120*n* normalizes and validates the address string.

A transformation 120*a* . . . 120*n* passes the information that matches the "any" wildcard schema node as output to allow further processing of the content (e.g., by a downstream transformation 120*a* . . . 120*n*). For instance, the output of a transformation 120*a* . . . 120*n* in the example described with reference to FIG. 3B for an input Factory element 350 is the Factory element 350 in which the address is replaced with the standardized address.

Note that transformation input and output schemas may be either induced by compiling the language (e.g., XSLT or XQuery) of a transformation 120*a* . . . 120*n* to create the input and output schemas or may be declared by a pipeline composer (e.g., a developer).

In certain embodiments, a stream representation of a hierarchical document (e.g., an XML document) turns each data item (e.g., each infoset item) into a stream of data items or an event. Such a stream of data items or event may be represented in many ways (e.g., as a SAX event or Binary XML). Embodiments are not specific to any of these representations and are applicable to any representation.

Embodiments increase the performance of a pipeline 112 by changing the event granularity (i.e., by collecting many data items into a single compressed event). This is possible when the transformation 120a . . . 120n does not require these data items in order to perform the actual transformation. For instance, the transformation 120a . . . 120n in the example with reference to FIG. 3A did not require "FullName" schema node 320 from the "ContactPerson" input schema 300 in order to standardize the "Address" schema node 310.

Figure 4:
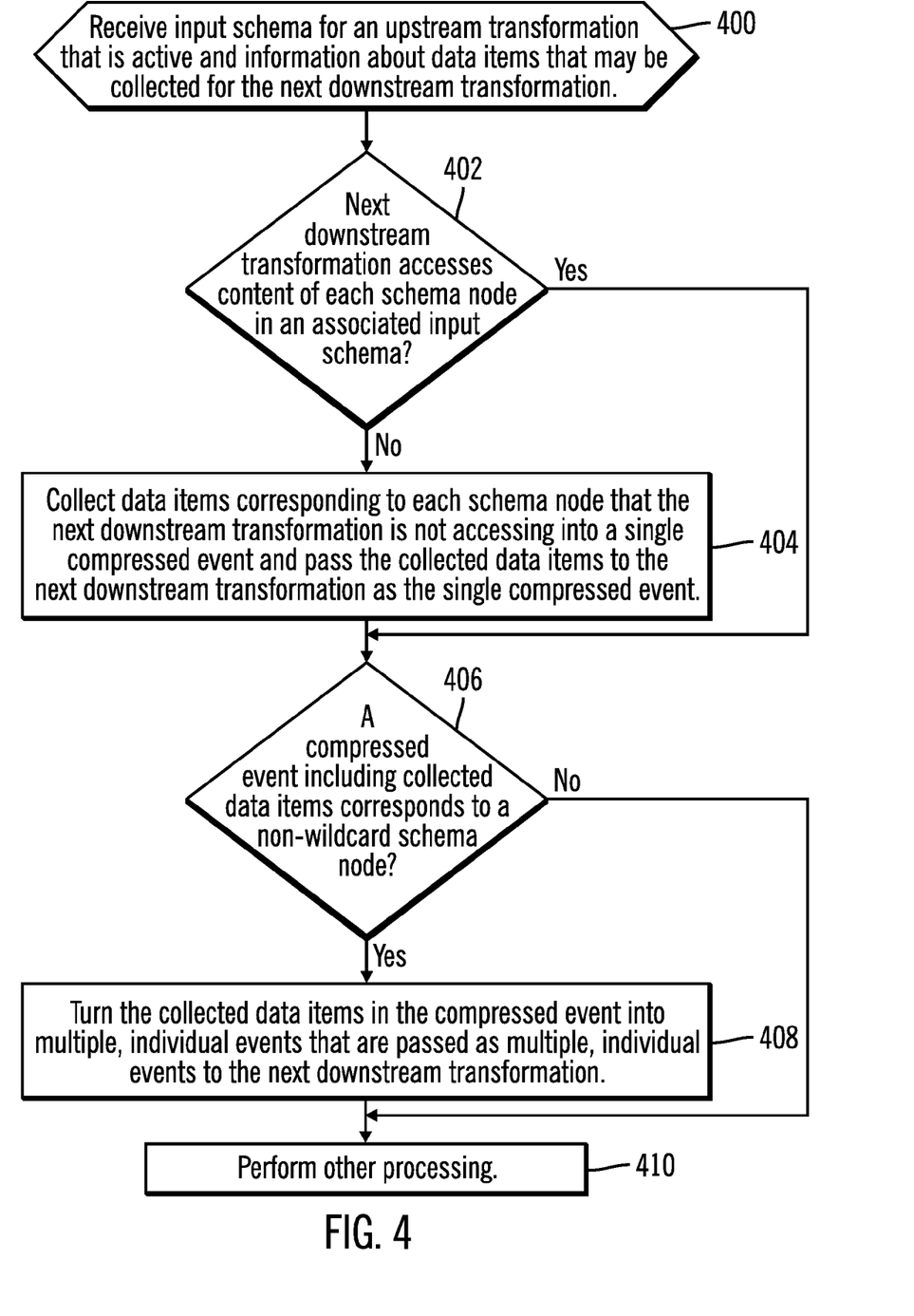
FIG. 4 illustrates logic performed in accordance with certain alternative embodiments.

FIG. 4 illustrates logic performed in accordance with certain embodiments. In certain embodiments, the pipeline processor 110 has access to the input and output schemas 150 of the transformations 120a . . . 120n and performs the processing of FIG. 4. For example, the pipeline processor collects data items and passes the collected data items to the next downstream transformation 120a . . . 120n, wherein the pipeline processor is coupled to multiple, individual transformations 120a . . . 120n. In certain embodiments an upstream transformation 120a . . . 120n is provided with the input schema of the next downstream transformation 120a . . . 120n, and the computation inside of the transformation 120a . . . 120n is optimized by collection and aggregation (i.e., the transformation 120a . . . 120n performs the processing of FIG. 4). For example, the upstream transformation 120a . . . 120n collects data items and passes the collected data items to the next downstream transformation 120a . . . 120n, wherein the upstream transformation 120a . . . 120n processes the hierarchical document 160 before the next downstream transformation 120a . . . 120n.

Control begins at block 400 with receipt of an input schema for an upstream transformation that is active (i.e., currently performing processing in the pipeline 112) and information about data items that may be collected for the next downstream transformation 120a . . . 120n. A hierarchical document 160 that is to be processed by the transformations 120a . . . 120n in the pipeline 112 is also received. In block 402, it is determined whether a next downstream transformation 120a . . . 120n accesses content of each schema node in an associated input schema (i.e., has a wildcard schema node in the input schema of the next downstream transformation 120a . . . 120n). If not, processing continues to block 404, otherwise, processing continues to block 406.

In block 404, data items (e.g., infoset items) corresponding to each schema node that the next downstream transformation is not accessing are collected into a single compressed event and passed to the next downstream transformation 120a . . . 120n as the single compressed event (rather than as multiple, individual events). The term compressed is used to indicate that the collected data items are transferred as a single object in a single action. This is more efficient than transferring the data items one by one. A single compressed event may also be referred to as a single aggregated event. There are multiple techniques that may be used to implement the collection of the events. In particular, there are techniques to make the transfer of a collection of events faster than transferring the events in the collection one by one. In some cases, it may be more efficient to transfer the identity of the data item rather than the data item itself in places in which the data item is not accessed.

In certain embodiments, the events are turned into a single opaque object that is passed along with the parent item. In certain alternative embodiments, the collected items are replaced with a unique key (e.g., a location identifier), and the next downstream transformation 120a . . . 120n that needs the items replaces the unique key with the corresponding collection of items (down the stream when needed).

In block 406, it is determined whether a compressed event that includes collected items corresponds to a non-wildcard schema node. If so, processing continues to block 408, otherwise, processing continues to block 410. In block 408, the collected items in the compressed event are turned into multiple, individual events and are passed as multiple, individual events to the next downstream transformation 120a . . . 120n. The compressed event may be described as being unfolded, unwrapped or uncompressed. That is, it is possible that an upstream transformation 120a . . . 120n aggregated data items into a single compressed event that should not have been aggregated.

In block 410, other processing is performed.

Thus, if a next downstream transformation 120a . . . 120n has a wildcard schema node, the data items that correspond to this wildcard schema node are collected. If at least one data item of a single compressed event corresponds to a non-wildcard schema node, the collected data items are turned into individual events (e.g., with one individual event corresponding to one data item).

In this manner, the collected data items are passed as a single compressed event between the producer (i.e., one transformation 120a . . . 120n) and a consumer (i.e., a next downstream transformation 120a . . . 120n) instead of passing multiple events, where the multiple events match the "any" element schema node.

Embodiments optimize pipeline processing by aggregating events. Depending on the type of processing, this optimization may save many consumer/produce operations of the transformations 120a . . . 120n, improving the throughput of the pipeline 112. In some cases, detailed information is needed for processing after many stages of processing (i.e., after being passed through many transformations 120a . . . 120n). Thus, an aggregate object that is created once early in the pipeline 112 and expanded as needed may save many copy operations that would otherwise be required to pass multiple (unaggregated) events.

Moreover, the collected items may be compressed into a more efficient memory structure, thus reducing memory consumption and possibly I/O.

In addition, standard XML transformations may be used without any required change to the XML transformations. Standard stream protocols, such as SAX and StaX, may be used without an enhancement to the protocols. For example, to implement the aggregation optimization for a SAX implementation, a mediator pattern may be used to stand between the SAX transformations and aggregate the events, without changing the transformations or the SAX interface.

In addition, the optimization of aggregating events may be applied to extension (also referred to as inheritance). Embodiments transform polymorphic schemas that use inheritance relationships between a parent schema node and corresponding child schema nodes to polymorphic schemas without inheritance relationships using wildcard schema nodes by: adding a wildcard schema node that provides a match for additional sub-elements and attributes of child schema nodes to the parent schema node and removing the inheritance relationship.

Figure 5A:
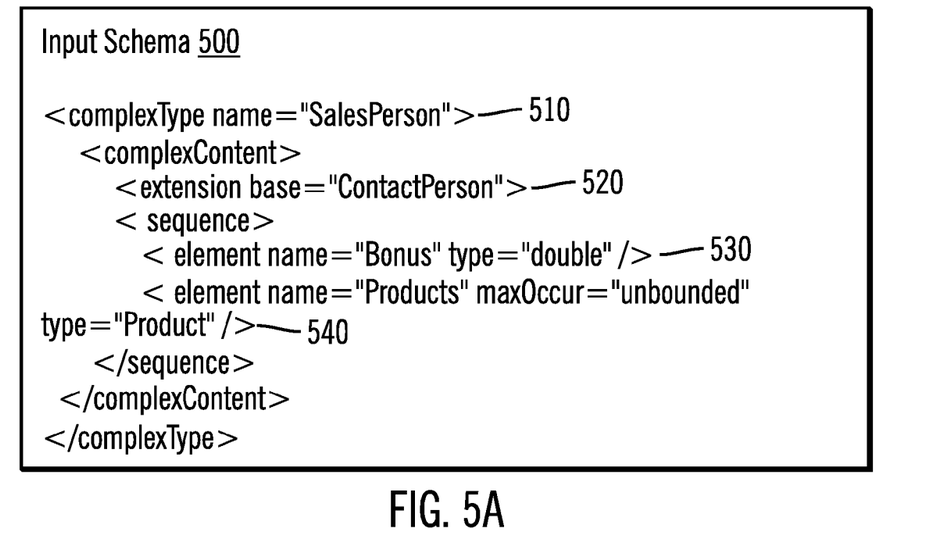
FIGS. 5A and 5B illustrate input schemas that show inheritance in accordance with certain embodiments.
Figure 5B:
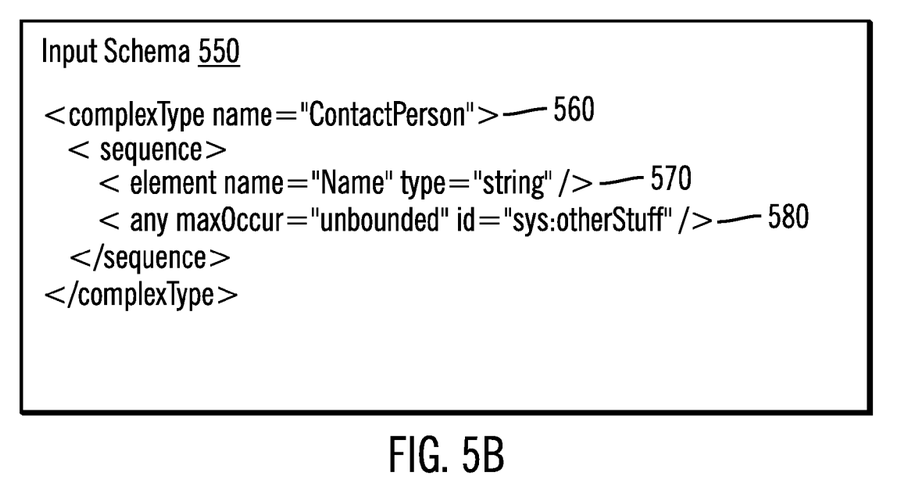

For example, if the schemas that describe the transformations 120a . . . 120n contain base elements, these base elements may be systematically extended by an "any" element wildcard schema node that provides a match for additional sub-elements and attributes of child elements. FIGS. 5A and 5B illustrate input schemas 500, 550 that show inheritance in accordance with certain embodiments. Input schema 500 for "SalesPerson" 510 extends a "ContactPerson" schema node 520 and has additional elements of "Bonus" 530 and "Products" 540. In FIG. 5A, it may be seen that "SalesPerson" 510 inherits "ContactPerson" 520. In FIG. 5B, the input schema 550 shows that the "Bonus" and "Product" elements 530, 540 have been aggregated by a system-generated "any" element

580 that is placed under the "ContactPerson" schema node 560 because a downstream transformation 120a . . . 120n uses just the ContactPerson name element 570 (not the Bonus and Product information). System-generated refers to the schema being changed by the system to accommodate this behavior).

Thus, embodiments use the wildcards in polymorphic schemas to determine which portions of a hierarchical document is affected by a particular transformation 120a . . . 120n.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIG. 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 4 may be implemented in software, hardware, programmable and non-programmable gate array logic or in some combination of hardware, software, or gate array logic.

Figure 6:
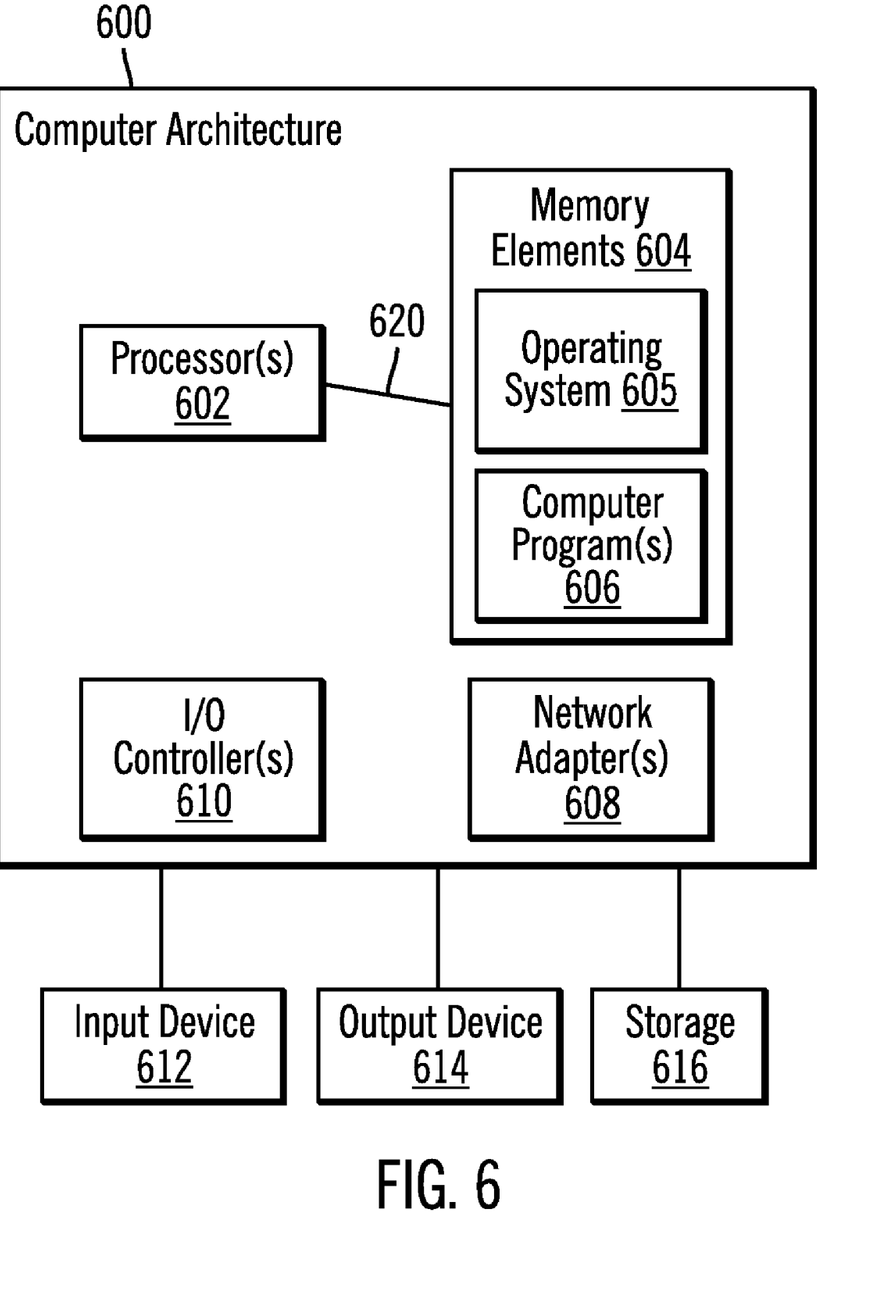
FIG. 6 illustrates a system architecture that may be used in accordance with certain embodiments.

FIG. 6 illustrates a system architecture 600 that may be used in accordance with certain embodiments. Computing device 100 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
receiving, with a processor of a computer, a hierarchical document to be processed by a pipeline of transformations;
determining whether a next downstream transformation accesses content of each schema node in an associated input schema, wherein the associated input schema is a polymorphic schema that includes a wildcard schema node;
in response to determining that the next downstream transformation is not accessing the content of each schema node in the associated input schema, collecting data items corresponding to each schema node that the next downstream transformation is not accessing into a single compressed event, wherein the collected data items of the single compressed event correspond to content of the wildcard schema node;
passing the collected data items to the next downstream transformation as the single compressed event, wherein the downstream transformation does not access the content of the single compressed event; and
transforming polymorphic schemas that use inheritance relationships between a parent schema node and corresponding child schema nodes to polymorphic schemas without inheritance relationships using wildcard schema nodes by:
adding a wildcard schema node that provides a match for additional sub-elements and attributes of child schema nodes to the parent schema node; and
removing the inheritance relationship.

2. The method of claim 1, wherein a pipeline processor collects the data items and passes the collected data items to the next downstream transformation, wherein the pipeline processor is coupled to multiple, individual transformations.

3. The method of claim 1, wherein an upstream transformation collects the data items and passes the collected data items to the next downstream transformation, wherein the upstream transformation processes the hierarchical document before the next downstream transformation.

4. The method of claim 1, further comprising:
determining that the single compressed event includes collected data items corresponds to a non-wildcard schema node in the next downstream transformation;
turning the collected data items in the single compressed event into multiple, individual events; and
passing the multiple, individual events to the next downstream transformation.

5. A computer program product comprising a computer readable device including a computer readable program, wherein the computer readable program when executed on a computer causes the computer to:
receive a hierarchical document to be processed by a pipeline of transformations;
determine whether a next downstream transformation accesses content of each schema node in an associated input schema, wherein the associated input schema is a polymorphic schema that includes a wildcard schema node;
in response to determining that the next downstream transformation is not accessing the content of each schema node in the associated input schema, collect data items corresponding to each schema node that the next downstream transformation is not accessing into a single compressed event, wherein the collected data items of the single compressed event correspond to content of the wildcard schema node;
pass the collected data items to the next downstream transformation as the single compressed event, wherein the downstream transformation does not access the content of the single compressed event; and
transform polymorphic schemas that use inheritance relationships between a parent schema node and corresponding child schema nodes to polymorphic schemas without inheritance relationships using wildcard schema nodes by:
adding a wildcard schema node that provides a match for additional sub-elements and attributes of child schema nodes to the parent schema node; and
removing the inheritance relationship.

6. The computer program product of claim 5, wherein a pipeline processor collects the data items and passes the collected data items to the next downstream transformation, wherein the pipeline processor is coupled to multiple, individual transformations.

7. The computer program product of claim 5, wherein an upstream transformation collects the data items and passes the collected data items to the next downstream transformation, wherein the upstream transformation processes the hierarchical document before the next downstream transformation.

8. The computer program product of claim 5, wherein the computer readable program when executed on a computer causes the computer to:
determine that the single compressed event includes collected data items corresponds to a non-wildcard schema node in the next downstream transformation;
turn the collected data items in the single compressed event into multiple, individual events; and
pass the multiple, individual events to the next downstream transformation.

9. A system, comprising:
a processor; and
storage coupled to the processor, wherein the storage stores a computer program, and wherein the processor is configured to execute the computer program to perform operations, wherein the operations comprise:
receiving a hierarchical document to be processed by a pipeline of transformations;
determining whether a next downstream transformation accesses content of each schema node in an associated input schema, wherein the associated input schema is a polymorphic schema that includes a wildcard schema node;
in response to determining that the next downstream transformation is not accessing the content of each schema node in the associated input schema, collecting data items corresponding to each schema node that the next downstream transformation is not accessing into a single compressed event, wherein the collected data items of the single compressed event correspond to content of the wildcard schema node;

passing the collected data items to the next downstream transformation as the single compressed event, wherein the downstream transformation does not access the content of the single compressed event; and transforming polymorphic schemas that use inheritance relationships between a parent schema node and corresponding child schema nodes to polymorphic schemas without inheritance relationships using wildcard schema nodes by:
    adding a wildcard schema node that provides a match for additional sub-elements and attributes of child schema nodes to the parent schema node; and
    removing the inheritance relationship.

10. The system of claim 9, wherein a pipeline processor collects the data items and passes the collected data items to the next downstream transformation, wherein the pipeline processor is coupled to multiple, individual transformations.

11. The system of claim 9, wherein an upstream transformation collects the data items and passes the collected data items to the next downstream transformation, wherein the upstream transformation processes the hierarchical document before the next downstream transformation.

12. The system of claim 9, further comprising:
    determining that the single compressed event includes collected data items corresponds to a non-wildcard schema node in the next downstream transformation;
    turning the collected data items in the single compressed event into multiple, individual events; and
    passing the multiple, individual events to the next downstream transformation.

* * * * *